United States Patent

Shimizu et al.

[11] Patent Number: 5,998,947
[45] Date of Patent: Dec. 7, 1999

[54] METHOD CAPABLE OF SURELY CHUCKING A FD INSERTED IN A HIGH-DENSITY TYPE FDD

[75] Inventors: Toshiharu Shimizu, Machida; Yoshihide Majima, Hadano; Toshimitsu Itoh; Hidetsugu Touji, both of Atsugi, all of Japan

[73] Assignee: Mitsumi Electric Co., Ltd., Tokyo, Japan

[21] Appl. No.: 08/998,640

[22] Filed: Dec. 29, 1997

[30] Foreign Application Priority Data

Dec. 27, 1996 [JP] Japan ................................. 8-351271
Jan. 14, 1997 [JP] Japan ................................. 9-004718

[51] Int. Cl.⁶ ........................... G11B 19/26; G11B 17/03
[52] U.S. Cl. .......................... 318/268; 318/449; 388/911; 369/239; 369/267
[58] Field of Search ..................... 318/268, 271, 318/449, 463; 388/911; 369/231, 233, 239, 264, 266, 267

[56] References Cited

U.S. PATENT DOCUMENTS

| | | | |
|---|---|---|---|
| 3,638,089 | 1/1972 | Gabor | 388/814 |
| 4,216,533 | 8/1980 | Ichimiya et al. | 365/189.04 |
| 5,619,087 | 4/1997 | Sakai | 310/268 |
| 5,812,337 | 9/1998 | Tanaka et al. | 360/73.12 |

*Primary Examiner*—Bentsu Ro
*Attorney, Agent, or Firm*—Frishauf, Holtz, Goodman, Langer & Chick, P.C.

[57] ABSTRACT

In a method of starting rotation of a magnetic disk medium of a large-capacity flexible disk by a spindle motor for use in a high-density type flexible disk drive for carrying out data recording and reproducing operation to and from the magnetic disk medium of the large-capacity flexible disk which requires to rotate at a high rotation speed on recording and reproducing, the method includes: a first step of rotating the spindle motor at a low rotation speed lower than the high rotation speed on rotation starting of the magnetic disk medium; a second step of rotating the spindle motor at the high rotation speed subsequently to rotating of the spindle motor at the low rotation speed; a third step of rotating the spindle motor at the low rotation speed subsequently to rotating of the spindle motor at the high rotation speed; and a fourth step of rotating the spindle motor at the high rotation speed subsequently to rotating of the spindle motor at the low rotation speed at the third step. The second and the fourth steps are carried out to ensure that the spindle motor chucks a disk hub of the large-capacity flexible disk. Each of the second and the fourth steps includes the steps of increasing the rotation speed of the spindle motor from the low rotation speed up to the high rotation speed by a predetermined abrupt acceleration; and rotating the spindle motor at a constant speed equal to the high rotation speed.

12 Claims, 10 Drawing Sheets

METHOD CAPABLE OF SURELY CHUCKING A FD INSERTED IN A HIGH-DENSITY TYPE FDD

BACKGROUND OF THE INVENTION

This invention relates to a high-density type flexible disk drive and, in particular, to a control method of a spindle motor for use in the high-density type flexible disk drive.

As is well known in the art, a flexible or floppy disk drive (which may be abbreviated to "FDD") of the type described is a device for carrying out data recording and reproducing operation to and from a magnetic disk medium of a flexible or floppy disk (which may be abbreviated to "FD") inserted therein. In recent years, the FDs are more and more improved to have a greater capacity. Specifically, development is made of the FDs having the storage capacity of 128 Mbytes (which may be called large-capacity FDs) in contrast with the FDs having storage capacity of 1 Mbyte or 2 Mbytes (which may be called small-capacity FDs). Following such development, the FDDs have also improved to accept the large-capacity FDs for data recording and reproducing operations to and from the magnetic disk media of the large-capacity FDs.

Throughout the present specification, FDDs capable of recording/reproducing data for magnetic disk media of the large-capacity FDs alone will be referred to high-density exclusive type FDDs. On the other hand, FDDs capable of recording/reproducing data for magnetic disk media of the small-capacity FDs alone will be called low-density exclusive type FDDs. Furthermore, FDDs capable of recording/reproducing data for magnetic disk media of both the large-capacity and the small-capacity FDs will be called high-density/low-density compatible type FDDs. In addition, the high-density exclusive type FDDs and the high-density/low-density compatible type FDDs will collectively be called high-density type FDDs.

The low-density exclusive type FDD and the high-density type FDD are different in mechanism from each other in several respects, one of which will be presently be described. In either FDD, a magnetic head is supported by a carriage which is driven by a drive arrangement to move in a predetermined radial direction with respect to the magnetic disk medium of the FD inserted in the FDD. The difference resides in the structure of the drive arrangement. More specifically, the low-density exclusive type FDD uses a stepping motor as the drive arrangement. On the other hand, the high-density type FDD uses a linear motor such as a voice coil motor (which may be abbreviated to "VCM") as the drive arrangement.

Now, description will be made in slightly detail as regards the voice coil motor used as the drive arrangement in the high-density type FDD. The voice coil motor comprises a voice coil and a magnetic circuit. The voice coil is disposed on the carriage at a rear side and is wound around a drive axis extending in parallel to the predetermined radial direction. The magnetic circuit generates a magnetic field in a direction intersecting that of an electric current flowing through the voice coil. With this structure, by causing the electric current to flow through the voice coil in a direction intersecting that of the magnetic field generated by the magnetic circuit, a drive force occurs in a direction extending to the drive axis on the basis of interaction of the electric current with the magnetic field. The drive force causes the voice coil motor to move the carriage in the predetermined radial direction.

Another difference between the low-density exclusive type FDD and the high-density type FDD resides in the number of revolution of a spindle motor for rotating the magnetic disk medium of the FD inserted therein. More specifically, the low-density exclusive type FDD can admit the small-capacity FD alone as the FD to be inserted thereinto. As a result, the spindle motor for the low-density exclusive type FDD may rotate the magnetic disk medium of the small-capacity FD inserted therein at a low rotation speed having the number of revolution of either 300 rpm or 360 rpm. On the other hand, the high-density type FDD can admit, as the FD to be inserted thereinto, either the large-capacity FD alone or both of the large-capacity FD and the small-capacity FD. As a result, when the large-capacity FD is inserted in the high-density type FDD, the spindle motor for the high-density type FDD must rotate the magnetic disk medium of the large-capacity FD inserted therein at a high rotation speed having the number of revolution of 3600 rpm which is equal to ten or twelve times as large as that of the small-capacity FD.

As a result, it is necessary for the high-density/low-density compatible type FDD to identify and detect whether the FD inserted therein is the large-capacity FD or the small-capacity FD.

In addition, the small-capacity FD and the large-capacity FD are different in structure from each other in several respects, one of which will presently be described. Both of the large-capacity and the small-capacity FDs have a flat rectangular shape of a width of 90 mm, a length of 94 mm, and a thickness of 3.3 mm in case of a 3.5-inch type. In either FD, a magnetic disk medium of disk-shaped is covered with a case which is called a shell. The case consists of an upper case and a lower case with the magnetic disk medium sandwiched therebetween. The lower case of the small-capacity FD is provided with a thin sheet-shaped board having a spring force for applying load to the magnetic disk medium in order to surely carry out chucking of the magnetic disk medium. Such a thin sheet-shaped board is called a lifter. On the other hand, the large-capacity FD is not provided with such a lifter. This is because it is unfavorable for the large-capacity FD to apply the load to the magnetic disk medium because the high-density type FDD must make the magnetic disk medium rotate at the high rotation speed of 3600 rpm as described above.

In prior art, in a case where the high-density type FDD carries out data recording and reproducing operation to and from the magnetic disk medium of the large-capacity FD inserted therein, the magnetic disk medium of the large-capacity FD is immediately rotated by the spindle motor at the high rotation speed on rotation starting.

In order to rotate the magnetic disk medium of the large-capacity FD by the spindle motor, it is necessary to surely chuck a disk hub of the large-capacity FD on rotation starting of the magnetic disk medium thereof.

More specifically, the disk hub is a disk-shaped metal which is freely received in a circular aperture formed in the lower case of the large-capacity FD at a center portion thereof. The disk hub has a disk center hole at a center portion and a chucking hole (a disk driving oval hole) at a position eccentric with the center portion. The disk hub holds the magnetic disk medium sandwiched between the upper case and the lower case. Accordingly, to rotate the magnetic disk medium may rotate the disk hub by the spindle motor. On the other hand, the spindle motor includes a rotor which comprises a disk holder table, a spindle shaft, and a chucking pin (a drive roller). The disk holder table is for holding the disk hub and is mechanically in contact with the disk hub on rotating of the magnetic disk medium. The spindle shaft is integrally coupled with the disk holder table with the spindle shaft perpendicularly raised from the disk holder table and is freely received in the disk center hole of the disk hub. The chucking pin is upwardly protruded from the disk holder table to move up and down and should be freely received in the chucking hole. That is, to surely chuck the disk hub with respect to the disk holder table is to make the chucking pin engage with a corner portion of the chucking hole in the disk hub in a radial direction outwardly with the chucking pin freely received in the chucking hole.

While the spindle motor rotates at the high rotation speed immediately on rotation starting in the manner of a conventional starting method for the spindle motor, the disk holder table also rotates at the high rotation speed. In this even, the chucking pin is put into a state buried in the disk holder table without the chucking pin received in the chucking hole. In the very worst case, although the chucking pin is instantaneously received in the chucking hole, there is a possibility of breaking of the chucking pin due to the impact of the chucking pin on the disk hub because the disk holder table rotates at the high rotation speed.

In order to solve such problems, the assignee of this application already filed a patent application (U.S. Ser. No. 08/859676). According to this patent application, there is provided a method for starting rotation of a magnetic disk medium of a large-capacity FD by a spindle motor for use in a high-density type FDD for carrying out data recording and reproducing operation to and from the magnetic disk medium of the large-capacity FD which requires to rotate at a high rotation speed (for example, 3600 rpm) on recording and reproducing. The method comprises a first step of rotating the spindle motor at a low rotation speed (for example, 300 rpm) lower than the high rotation speed on rotation starting of the magnetic disk medium and a second step of rotating the spindle motor at the high rotation speed subsequently to rotating of the spindle motor at the low rotation speed. The second step is carried out in order to make the spindle motor surely chuck the disk hub of the large-capacity FD.

However, even in accordance with the method, there is a case where the spindle motor does not chuck the disk hub of the large-capacity FD.

SUMMARY OF THE INVENTION

It is therefore an object of this invention to provide a rotation starting method of a spindle motor and a disk chucking method for a high-density type FDD, which is capable of surely chucking a disk hub or a large-capacity FD on rotation starting of a magnetic disk medium of a large-capacity FD.

It is another object of this invention to provide a disk chucking confirming method and a spindle motor start controlling method, which is capable of confirming whether or not a spindle motor surely chucks the large-capacity FD.

Other objects of this invention will become clear as the description proceeds.

A method to which this invention is applicable is for starting rotation of a magnetic disk medium of a large-capacity flexible disk by a spindle motor for use in a high-density type flexible disk drive for carrying out data recording and reproducing operation to and from the magnetic disk medium of the large-capacity flexible disk which requires to rotate at a high rotation speed on recording and reproducing. The large-capacity flexible disk has a disk hub for holding the magnetic disk medium.

According to this invention, the method comprises: a first step of rotating the spindle motor at a low rotation speed lower than the high rotation speed on rotation starting of the magnetic disk medium; a second step of rotating the spindle motor at the high rotation speed subsequently to rotating of the spindle motor at the low rotation speed; a third step of rotating the spindle motor at the low rotation speed subsequently to rotating of the spindle motor at the high rotation speed; and a fourth step of rotating the spindle motor at the high rotation speed subsequently to rotating of the spindle disk at the low rotation speed at the third step. The second and the fourth steps are carried out to ensure that the spindle motor chucks the disk hub of the large-capacity flexible disk.

A disk chucking method to which this invention is applicable is for use in a high-density type flexible disk drive for carrying out data recording and reproducing operation to and from a magnetic disk medium of a large-capacity flexible disk which requires to rotate at a high rotation speed on recording and reproducing. The large-capacity flexible disk has a structure so as to reduce a road with respect to the magnetic disk medium on rotating thereof. The large-capacity flexible disk comprises a disk hub for holding the magnetic disk medium. The disk hub has a chucking hole with a corner portion in the disk hub in a radial direction outwardly. The high-density type flexible disk drive includes a spindle motor for rotating the disk hub. The spindle motor comprises a disk holder table for holding the disk hub and a chucking pin which should be freely received in the chucking hole. The disk holder table has a table driving oval hole with an inclined portion.

According to this invention, the method comprises: a first step of rotating the spindle motor at a low rotation speed lower than the high rotation speed on rotation starting of the magnetic disk medium; a second step of rotating the spindle motor at the high rotation speed subsequently to rotating of the spindle motor at the low rotation speed; a third step of rotating the spindle motor at the low rotation speed subsequently to rotating of the spindle motor at the high rotation speed; and a fourth step of rotating the spindle motor at the high rotation speed subsequently to rotating of the spindle motor at the low rotation speed at the third step. Each of the second and the fourth steps comprises the step of increasing the rotation speed of the spindle motor from the low rotation speed up to the high rotation speed by a predetermined abrupt acceleration to make the chucking pin by the predetermined abrupt acceleration move in the table driving oval hole of the disk holder table along the inclined portion thereof in the radial direction outwardly and to make the chucking pin engage with the corner portion of the chucking hole, whereby chucking is surely carried out between the disk holder table and the disk hub.

A disk chucking confirming method to which this invention is applicable is for use in a high-density type flexible disk drive for carrying out data recording and reproducing operation to and from a magnetic disk medium of a large-capacity flexible disk which requires to rotate at a high rotation speed by a spindle motor of the high-density type flexible disk drive on recording and reproducing. The spindle motor includes a motor index detection magnet fixed thereto for generating a magnetic field as a motor index. The high-density type flexible disk drive includes a magnetic sensor for detecting the magnetic field as a motor index signal. The large-capacity flexible disk comprises a plurality of tracks arranged on the magnetic disk medium with concentric circles. Each track is divided into a predetermined number of sectors having a length equal to one another. Each sensor preliminarily memories a servo signal having a sector index. The method is for confirming whether or not the spindle motor surely chucks the magnetic disk medium of the large-capacity flexible disk.

According to this invention, the method comprises: a first step of rotating the spindle motor at the high rotation speed; a second step of confirming that the spindle motor is rotated at the high rotation speed on the basis of the motor index signal; a third step of reading, as a sector index signal, the sector indexes of the servo signals from the sectors on the magnetic disk medium; and a fourth step of judging whether or not the sector index signal is correctly detected so as to confirm whether or not the spindle motor surely chucks the magnetic disk medium of the large-capacity flexible disk.

A spindle motor start controlling method to which this invention is applicable is for use in a high-density type flexible disk drive for carrying out data recording and reproducing operation to and from a magnetic disk medium of a large-capacity flexible disk which requires to rotate at a high rotation speed by a spindle motor of the high-density type flexible disk drive on recording and reproducing. The spindle motor includes a motor index detection magnet fixed thereto for generating a magnetic field as a motor index. The high-density type flexible disk drive includes a magnetic sensor for detecting the magnetic field as a motor index signal. The large-capacity flexible disk comprises a plurality of tracks arranged on the magnetic disk medium with concentric circles. Each track is divided into a predetermined number of sectors having a length equal to one another. Each sector preliminarily memorizes a servo signal having a sector index. The method is for controlling a start of rotation of the magnetic disk medium due to the spindle motor.

According to this invention, the method comprises: a first step of rotating the spindle motor at the high rotation speed; a second step of confirming that the spindle motor is rotated at the high rotation speed on the basis of the motor index signal; a third step of reading, as a sector index signal, the sector indexes of the servo signals from the sectors on the magnetic disk medium; a fourth step of judging whether or not the sector index signal is correctly detected so as to confirm whether or not the spindle motor surely chucks the magnetic disk medium of the large-capacity flexible disk; and a fifth step of announcing an alarm and of stopping the spindle motor when the fourth step confirms that the spindle motor does not surely chuck the magnetic disk medium of the large-capacity flexible disk by judging that the sector index signal is not correctly detected.

DESCRIPTION OF THE PREFERRED EMBODIMENTS

Figure 1:
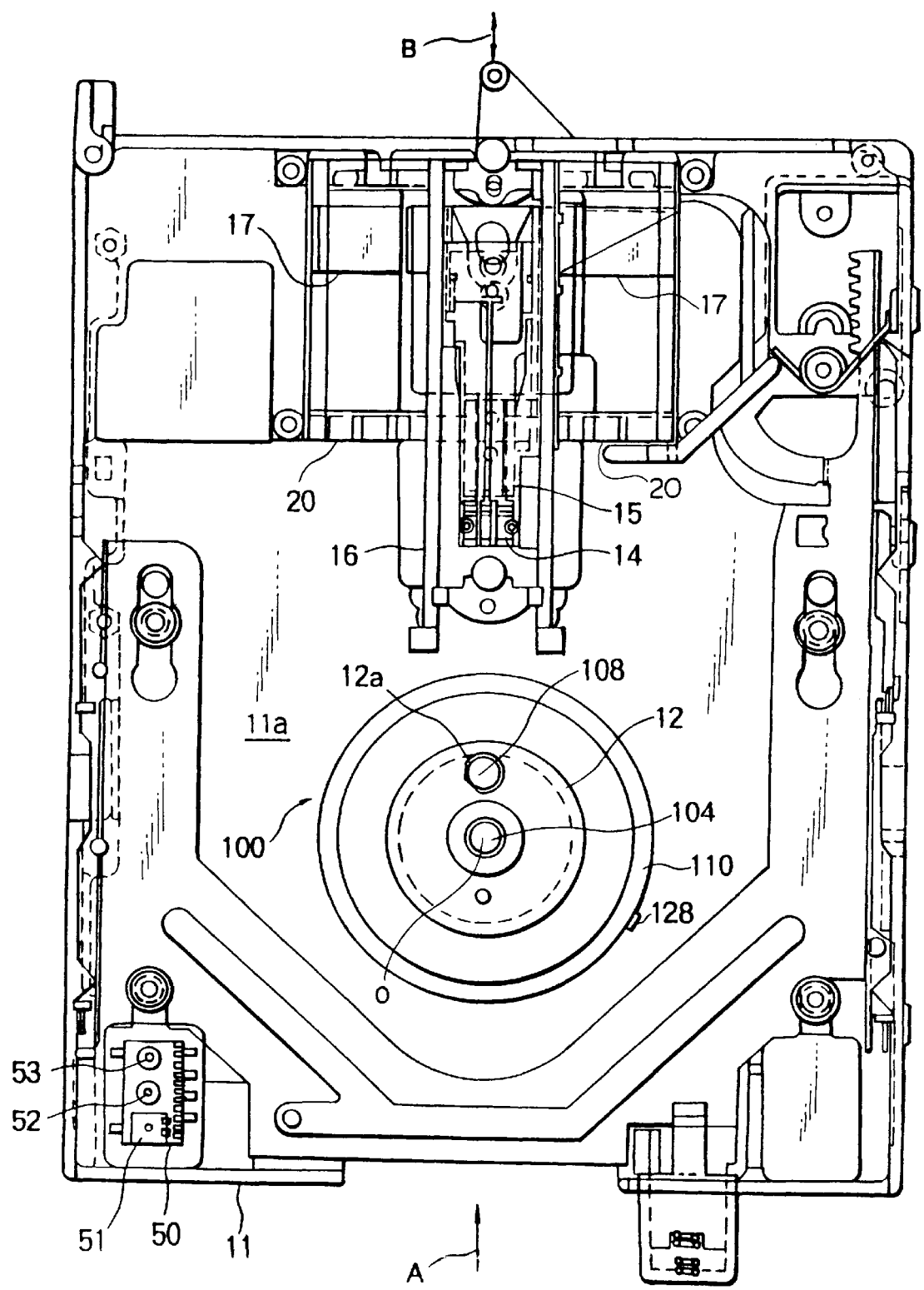
FIG. 1 is a plan view of a high-density type flexible drive drive to which this invention is applicable.

Referring to FIG. 1, description will proceed to a high-density type FDD to which this invention is applicable. The illustrated high-density type FDD is a high-density/low-density compatible type FDD for enabling to carry out recording/reproducing of data for magnetic disk media of both a large-capacity and a small-capacity FDs which will later be described. The FD is inserted into the high-density type FDD from an insertion direction indicated by an arrow A in FIG. 1. FIG. 1 shows a state where the FD is inserted into the high-density type FDD. The FD has a disk center axis (not shown).

The high-density type FDD comprises a main frame 11 having a main surface 11a and a disk holder table 12 which is rotatably supported on the main surface 11a of the main frame 11. The disk holder table 12 has a table center axis O which acts as the axis of the rotation. The inserted FD is held on the holder disk table 12 so that the table center axis O coincides with the disk center axis. The disk holder table 12 is rotatably driven by a spindle motor 100 which will later be described. The spindle motor 100 is mounted on the main frame 11 with the spindle motor 100 put into a state embedded in a concave portion (which will later be descried) of the main frame 11, thereby the magnetic disk medium in the FD rotates at a desired rotation speed in the manner which will become clear. In addition, the main frame 11 has a back surface (not shown) on which a printed-circuit board (not shown) is attached. A number of electronic parts (not shown) are mounted on the printed-circuit board.

The high-density type FDD comprises a pair of magnetic heads (not shown) for reading/writing data from/to the magnetic disk medium in the FD. The magnetic heads are supported via gimbals 14 with the carriage 15. A combination of the magnetic heads, the gimbals 14, the carriage 15, a pair of voice coils 17 (which will later be described), a scale (not shown), a spring holder, and a spring is called a carriage assembly. The carriage 15 is disposed over the main surface 11a of the main frame 11 with a space left therebetween. The carriage 15 supports the magnetic heads movably in a predetermined radial direction (i.e. a direction indicated by an arrow B in FIG. 1) with respect to the FD.

The carriage 15 is supported and guided at both lower sides thereof by a pair of guide bars 16 which extend to directions in parallel with the predetermined radial direction B.

The carriage 15 is driven in the predetermined radial direction B by a voice coil motor which will later be described. More specifically, the voice coil motor comprises the pair of voice coils 17 and a pair of magnetic circuits 20. The voice coils 17 are disposed on the carriage 15 at a rear side and are wound around driving axes in parallel with the predetermined radial direction B. The magnetic circuits 20 generate magnetic fields which intersect currents flowing in the voice coils 17. With this structure, by causing the currents to flow in the voice coils 17 in directions where the magnetic fields generated by the magnetic circuits 20 intersect, driving force occurs only the predetermined radial direction B extending to the driving axes on the basis of interaction between the currents and the magnetic fields. The driving force causes the voice coil motor to move the carriage 15 in the predetermined radial direction B.

Figure 2A:
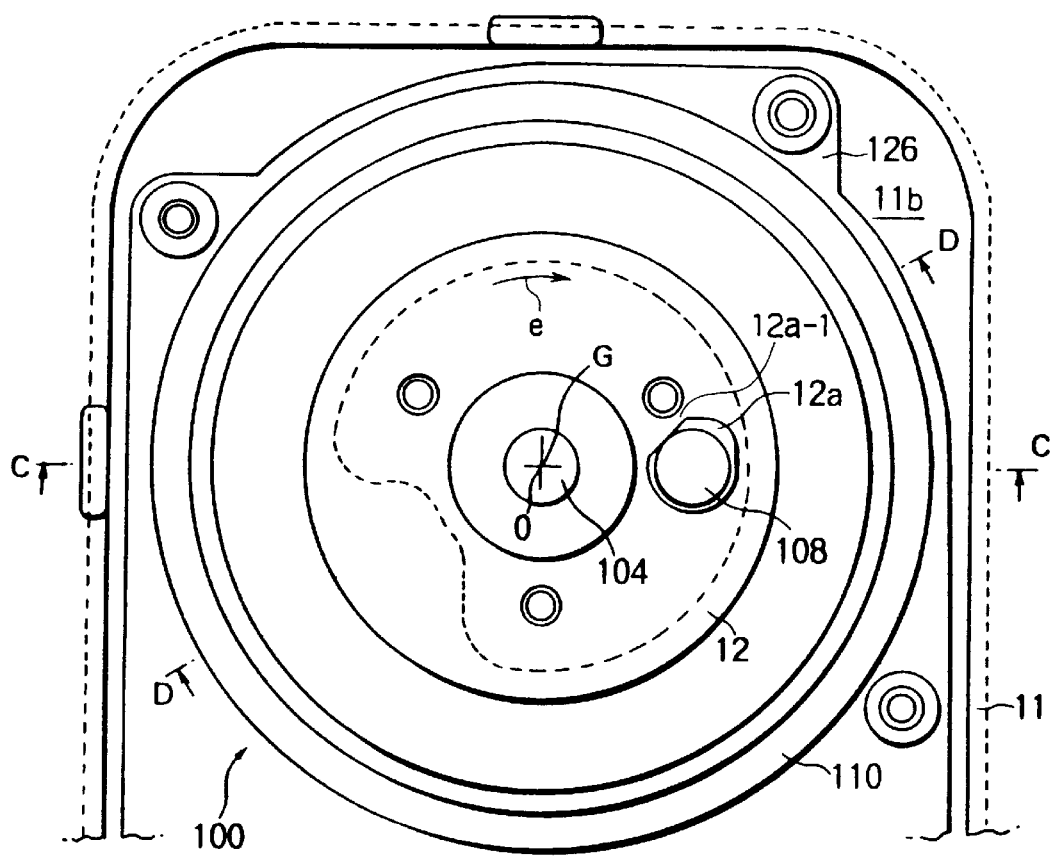
FIGS. 2A and 2B collectively show the spindle motor for use in the high-density type flexible disk drive illustrated in FIG. 1.
Figure 2B:
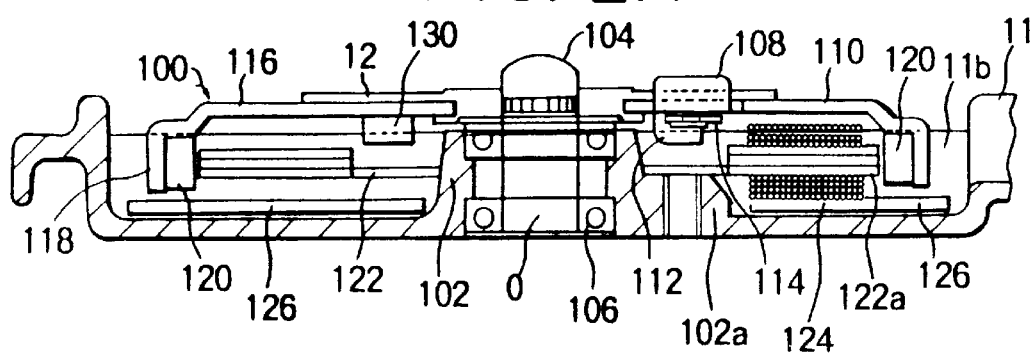

Referring to FIGS. 2A and 2B, description will proceed to the spindle motor 100 for use in the high-density type FDD illustrated in FIG. 1. The spindle motor 100 comprises a rotor and a stator both of which will later become clear. FIG. 2A is a plan view of the spindle motor 100. FIG. 2B is a cross-sectional view taken on line C—C with respect to the rotor and on line D—D with respect to the stator in FIG. 2A.

The illustrated spindle motor 100 is a type mounted on the main surface 11a of the main frame 11 in place of the back surface of the main frame 11. In particular, the spindle motor 100 is mounted on the main surface 11a with the spindle motor 100 embedded in the concave portion 11b of the main frame 11.

The main frame 11 comprises a bearing metal 102 of substantially cylindrical shape in the concave portion 11b. The bearing metal 102 stands in the concave portion 11b substantially perpendicular to the main surface 11a of the main frame 11. With the bearing metal 102, a spindle shaft 104 is rotatably supported with respect to the main frame 11 via a ball bearing 106 substantially perpendicular to the main surface 11a of the main frame 11. The spindle shaft 104 serves as the axis O of the rotation for the magnetic disk medium of the FD inserted in the high-density type FDD. The disk holder table 12 is fixed to the spindle shaft 104 at an upper portion thereof. The disk holder table 12 has a main surface which extends to a direction perpendicular to a longitudinal direction (a direction of the axis O of the rotation) of the spindle shaft 104.

That is, the disk holder table 12 is rotatably supported on the main surface 11a of the main frame 11 and holds the FD inserted in the high-density type FDD so that the table center axis O (the axis of the rotation) coincides with the disk center axis of the FD.

Figure 3:
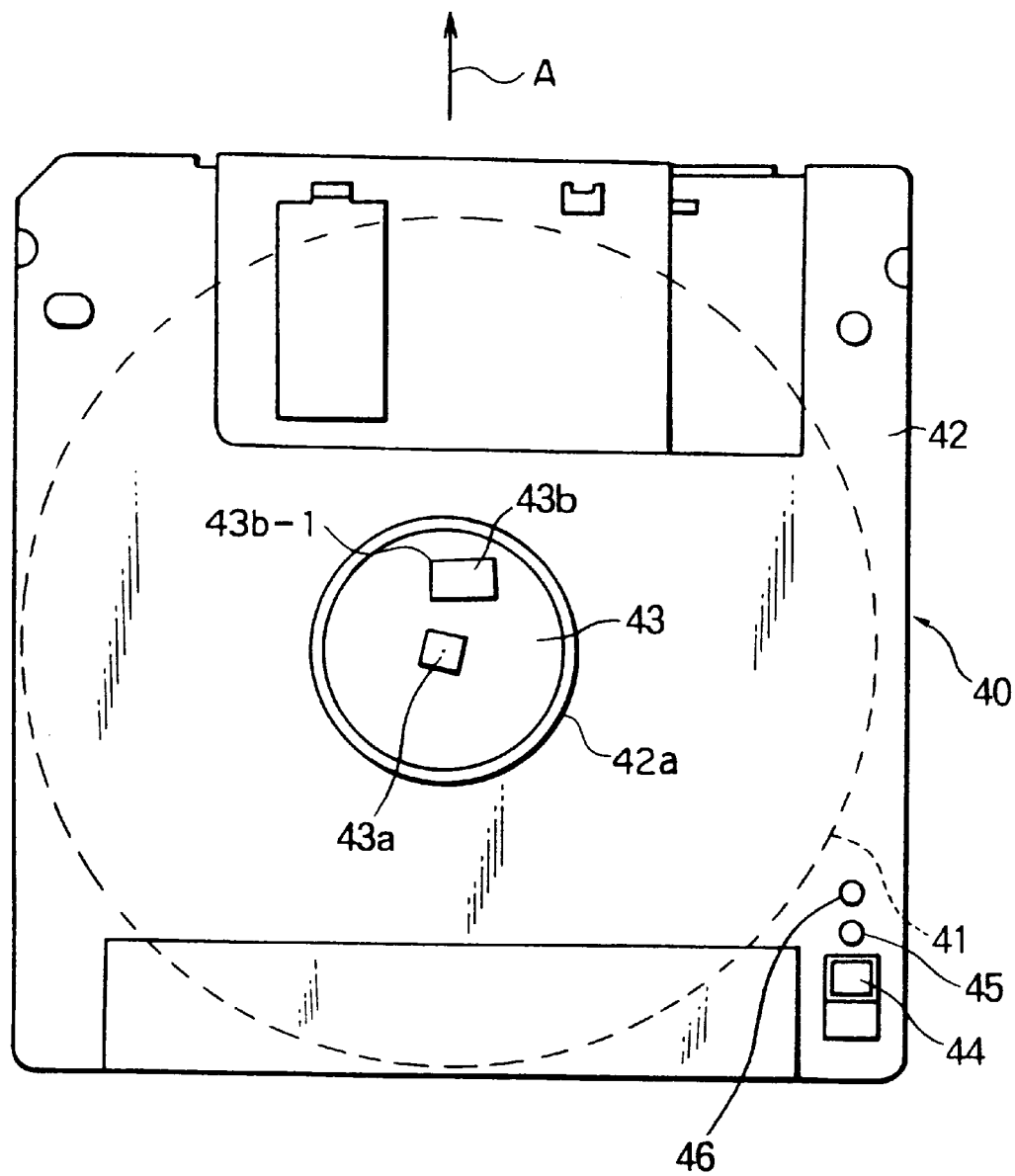
FIG. 3 is a plan view showing a bottom surface of a large capacity flexible disk inserted in the high-density type flexible disk drive illustrated in FIG. 1.

Turning to FIG. 3, description will proceed to the large-capacity FD depicted at 40. FIG. 3 is a plan view showing a bottom surface of the large-capacity FD 40. The illustrated large-capacity FD 40 is a 3.5-inch type and comprises a magnetic disk medium 41 serving as a magnetic recording medium, and a case 42 for covering the magnetic disk medium 41. The case 42 consists of an upper case (not shown) having a main surface and a lower case having the bottom surface. In the bottom surface of the case 42, a circular aperture 42a is formed at a center portion of the large-capacity FD 40. In the circular aperture 42a is freely received a disk hub (a disk-shaped metal) 43 for holding the magnetic disk medium 41. The disk hub 43 has a disk center hole 43a at a center portion thereof and a chucking hole (a disk driving oval hole) 43b at a position eccentric with the center portion thereof. The disk center hole 43a has substantially a rectangular shape and receives the spindle shaft 104 (FIG. 2B) therein in the manner which will later be described. The chucking hole 43b freely receives a chucking pin or a drive roller (which will later be described) therein in the manner which will also later be described.

Turning back to FIGS. 2A and 2B, the disk holder table 12 has a diameter which is longer than that of the disk hub 43 and which is shorter than that of the circular aperture 42a of the case 42.

The disk holder table 12 has a table driving oval hole 12a at a position corresponding to the chucking hole (the disk driving oval hole) 43b (FIG. 3). Through the table driving oval hole 12a, the chucking pin (the drive roller) 108 is freely received in the chucking hole 43b of the FD 40 in the manner which will later become clear. The table driving oval hole 12a has an inclined portion 12a-1 as shown in FIG. 2A. The disk holder table 12 is mounted on a magnetic case 110 at a bottom surface thereof. The magnetic case 110 has a flexible arm 112 having an end which is provided with a holding portion 114. The chucking pin 108 is rotatably and movably mounted on the flexible arm 112 at the end thereof via the holding portion 114 with the chucking pin 108 urged upwardly. Accordingly, the chucking pin 108 moves downwardly or sinks in the disk holder table 12 if any load is applied to the chucking pin 108 downwards.

In the example being illustrated, the magnetic case 110 is made of iron and is formed in a shape of a tray by presswork. More specifically, the magnetic case 110 comprises a disk portion 116 and a circumferential wall 118. The disk portion 116 extends in a direction parallel with the disk holder table 12. The circumferential wall 118 is bent downwardly at an circumferential edge of the disk portion 116. The circumferential wall 118 has an inner surface on which a ring-shaped main magnet 120 is fixed.

At any rate, the spindle shaft 104, the disk holder table 12, the chucking pin 108, the magnetic case 110, the arm 112, the holding portion 114, and the main magnet 118 compose the rotor of the spindle motor 100.

The bearing metal 102 includes a flange portion 102a. On the flange portion 102, a core 122 is fixed by screws (not shown) and is mounted. The core comprises a plurality of magnetic pole forming sections 112a which extend with equal intervals in a radial manner. Around each magnetic pole forming section 112a, a coil 124 is wound. That is, a combination of the magnetic pole forming section 112a and the coil 124 serves as an electromagnet or a magnetic pole. The electromagnet is opposed to the above-mentioned main magnet 120 with a predetermined space (gap) left therebetween. At any rate, the core 122 and the coils 124 compose the stator of the spindle motor 100.

The circumferential wall 118 of the magnetic case 110 has an outer surface at a predetermined position of which a motor index detection magnet 128 (FIG. 1) of rectangular parallelepiped shape is fixed. The motor index detection magnet 128 generates a magnetic field as a motor index. In addition, in the concave portion 11b of the main frame 11, a printed-circuit board 126 is fixed by screws (not shown) and is received. Mounted on the printed-circuit board 126, a magnetic sensor detects the magnetic field generated as the motor index by the motor index detection magnet 128.

Furthermore, the illustrated spindle motor 100 is provided with a balancer 130 acting as a balance arrangement. The balancer 130 is mounted on the magnetic case 110 at the bottom surface thereof opposite to the chucking pin 108 with the spindle shaft 104 sandwiched therebetween. As a result, it is possible to balance the rotor of the spindle motor 100 on rotating (in particular, on rotating at the high rotation speed) so as to make the center G of gravity in the rotor coincide with the axis O of the rotation.

Referring to FIG. 3 again, a write protection hole (not shown) is bored in the case 42 of the large-capacity FD 40 at a corner portion in rear and right-hand side with respect to an insertion direction depicted at an arrow A of FIG. 3 as viewed from the bottom surface of the large-capacity FD 40. In other words, the write protection hole is bored in the case 42 of the large-capacity FD 40 at the corner portion in rear and left-hand side in the insertion direction A as viewed from the main surface of the large-capacity FD 40. FIG. 3 shows a state where the write protection hole is shut by a write protection tab 44. The write protection tab 44 enables to slide in the insertion direction A. It is possible to carry out opening and closing of the write protection hole by operating the write protection tab 44 manually. When the write protection hole is closed by the write protection tab 44, the large-capacity FD 40 is put into a write enable state. When the write protection hole is opened by the write protection tab 44, the large-capacity FD 40 is put into a write disable state.

The illustrated large-capacity FD 40 shows a case where there is two types of storage capacity of, for example, 128 Mbytes and 256 Mbytes. In the neighborhood of the write protection hole, a large-capacity identification hole 45 is bored in the case 42 of the large-capacity FD 40. The large-capacity identification hole 45 is for identifying the large-capacity FD 40 in distinction from the small-capacity FD. In addition, a type identification hole 46 is selectively bored in the case 42 of the large-capacity FD 40 near the write protection hole together with the large-capacity identification hole 45. The type identification hole 46 is for identifying a type of the large-capacity FD 40. It is possible to identify the type of the large-capacity FD 40 according to the presence or absence of the type identification hole 46. It is assumed that the large-capacity FD 40 having the storage capacity of 128 Mbytes is referred to a first type of the large-capacity FD while the large-capacity FD 40 having the storage capacity of 256 Mbytes is referred to a second type of the large-capacity FD. In the example being illustrated, the type identification hole 46 is not bored in the case 42 of the first type of the large-capacity FD while the type identification hole 46 is bored in the case 42 of the second type of the large-capacity FD.

Although illustration is omitted, as is well known in the art, the large-capacity identification hole 45 and the type identification hole 46 are not bored in a case of the small-capacity FD.

Turning back to FIG. 1 in addition to FIG. 3, on the printed-circuit board (not shown) mounted on the back surface of the main frame 11, the high-density type FDD further comprises a switch unit 50 at a corner position in rear and left-hand side with respect to the insertion direction A. The switch unit 50 comprises a plurality of push switches which will presently be described. The switch unit 50 is for detecting the presence or absence of the write protection hole, the large-capacity identification hole 45, and the type identification hole 46.

More specifically, the switch unit 50 comprises a write control switch 51, a large-capacity detection switch 52, and a type detection switch 53. The write control switch 51 is a switch for detecting the opening or closing state of the write protection hole and is disposed at a position corresponding to the write protection hole. The large-capacity detection switch 52 is a switch for detecting whether the inserted FD is the large-capacity FD 40 or the small-capacity FD and is disposed at a position corresponding to the large-capacity identification hole 45. The type detection switch 53 is a switch for detecting the presence or absence of the type identification hole 45 and is disposed at a position corresponding to the type identification hole 46.

Although illustration is omitted, the stator of the spindle motor 100 comprises a frequency generation pattern (which is abbreviated an FG pattern hereinafter) for detecting the rotation speed thereof. The FG pattern generates an FG signal having pulses which are in number to sixty during one rotation of the spindle motor 100. As is well known in the art, 300 rpm is equivalent to 5 Hz/rev while 3600 rpm is equivalent to 60 Hz/rev. As a result, the FG pattern generates the FG signal having a frequency of 300 Hz if the magnetic disk medium of the small-capacity FD rotates at its prescribed rotation speed of 300 rpm by the spindle motor 100. Likewise, the FG pattern generates the FG signal having a frequency of 3600 Hz if the magnetic disk medium of the large-capacity FD 40 rotates at its prescribed rotation speed of 3600 rpm by the spindle motor 100.

Figure 4:
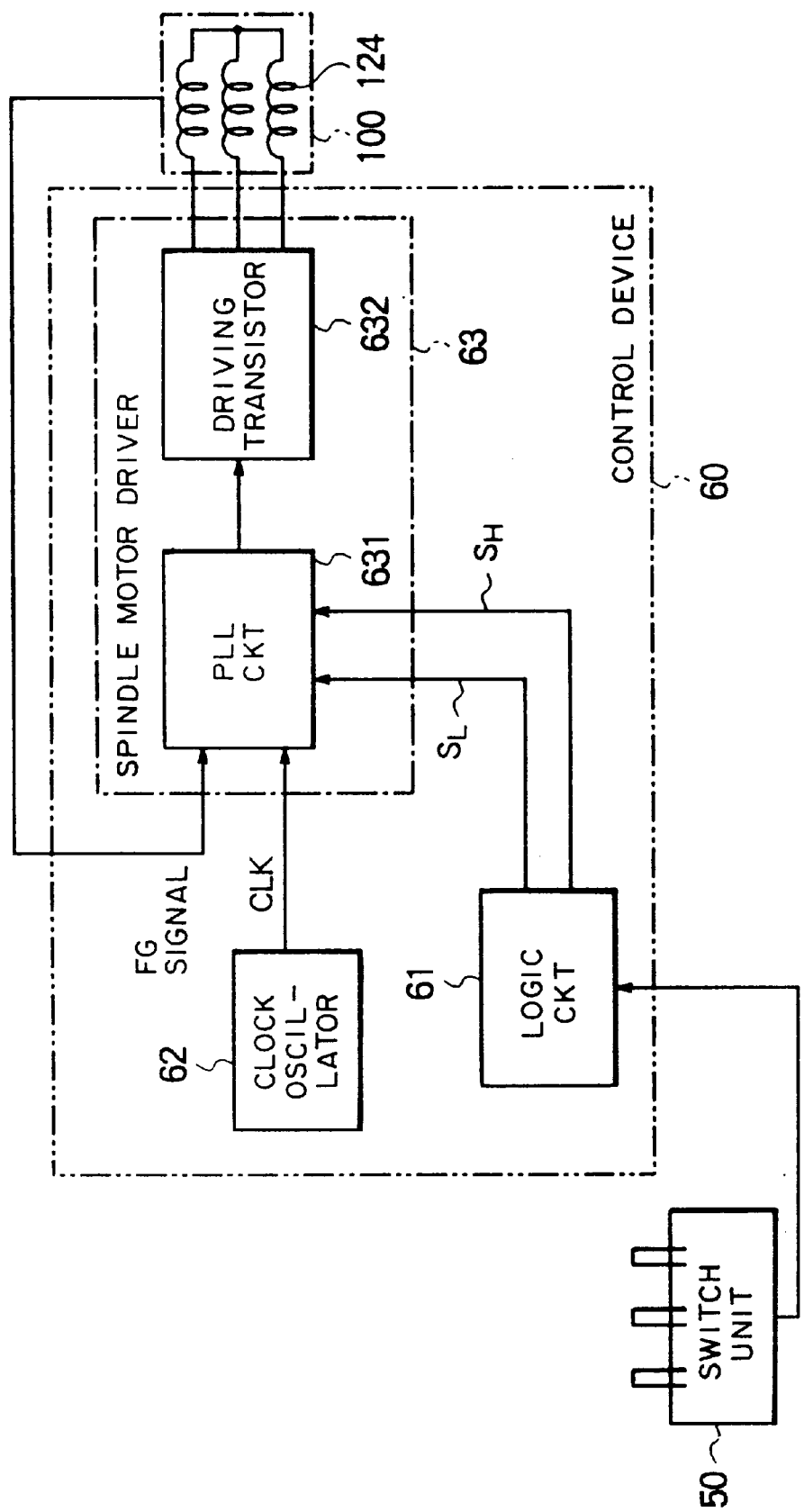
FIG. 4 is a block diagram of a control system which carries out a starting method for the spindle motor and a disk chucking method according to this invention.

Turning to FIG. 4, description will proceed to a control system which is used in this invention. The illustrated control system a control device 60 as well as the switch unit 50 illustrated in FIG. 1. The control device 60 is for controlling drive of the spindle motor 100. The control device 60 comprises a logic circuit 61, a clock oscillator 62, and a spindle motor driver 63. Responsive to a detected signal from the switch unit 50, the logic circuit 61 selectively produces one of a low speed selection signal $S_L$ and a high speed selection signal $S_H$ in the manner which will later become clear. The clock oscillator 62 oscillates a clock signal CLK having a clock frequency of 1 MHz. Responsive either the low speed selection signal $S_L$ or the high speed selection signal $S_H$, the spindle motor driver 63 drives the spindle motor 100 in synchronism with the clock signal CLK on the basis of the FG signal.

The low speed selection signal $S_L$ is a signal indicative of making the magnetic disk medium of the inserted FD rotate at the low rotation speed of 300 rpm. The high speed selection signal $S_H$ is a signal indicative of making the magnetic disk medium of the inserted FD rotate at the high rotation speed of 3600 rpm.

The spindle motor driver 63 comprises a phase-locked loop (PLL) circuit 631 and a driving transistor 632. The PLL circuit 631 includes a frequency divider (not shown) for frequency dividing the clock signal CLK. Responsive to the low speed selection signal $S_L$, the frequency divider frequency divides the clock signal CLK having the clock frequency of 1 MHz into a divided signal signal having a divided frequency of 300 Hz. Likewise, responsive to the high speed selection signal $S_H$, the frequency divider frequency divides the clock signal having the clock frequency of 1 MHz into a divided signal having a divided frequency of 3600 Hz. The PLL circuit 631 detects a phase difference between the FG signal and the divided signal to produce a control signal indicative of the phase difference. On the basis of the control signal, the driving transistor 632 drives the spindle motor 100. That is, the spindle motor driver 63 drives the spindle motor 100 so that the frequency of the FG signal coincides with the divided frequency of the divided signal.

Description will proceed to operation of the control system of FIG. 4.

It is assumed that the large-capacity FD 40 (FIG. 3) is inserted in the high-density/low-density compatible type FDD illustrated in FIG. 1. In this even, the switch unit 50 detects that the inserted FD is the large-capacity FD 40 and then supplies the logic circuit 61 with the detected signal indicative of detection of the large-capacity FD 40. Responsive to the detected signal, the logic circuit 61 determines that the inserted FD is the large-capacity FD 40 and then delivers the high speed selection signal $S_H$ to the spindle motor driver 63. Responsive to the high speed selection signal $S_H$, the spindle motor driver 63 drives the spindle motor 100 so as to rotate at the high rotation speed of 3600 rpm.

It is assumed that the small-capacity FD is inserted in the high-density/low-density compatible type FDD illustrated in FIG. 1. In this event, the switch unit 50 detects that the inserted FD is the small-capacity FD and then supplies the logic circuit 61 with the detected signal indicative of detection of the small-capacity FD. Responsive to the detected signal, the logic circuit 61 determines that the inserted FD is the small-capacity FD and then delivers the low speed selection signal $S_L$ to the spindle motor driver 63. Responsive to the low speed selection signal $S_L$, the spindle motor driver 63 drives the spindle motor 100 so as to rotate at the low rotation speed of 300 rpm.

As described above, the control system determines the type of the inserted FD and automatically rotates, on the basis of result of determination, the magnetic disk medium of the inserted FD at the rotation speed matched therewith by the spindle motor 100.

Figure 5:
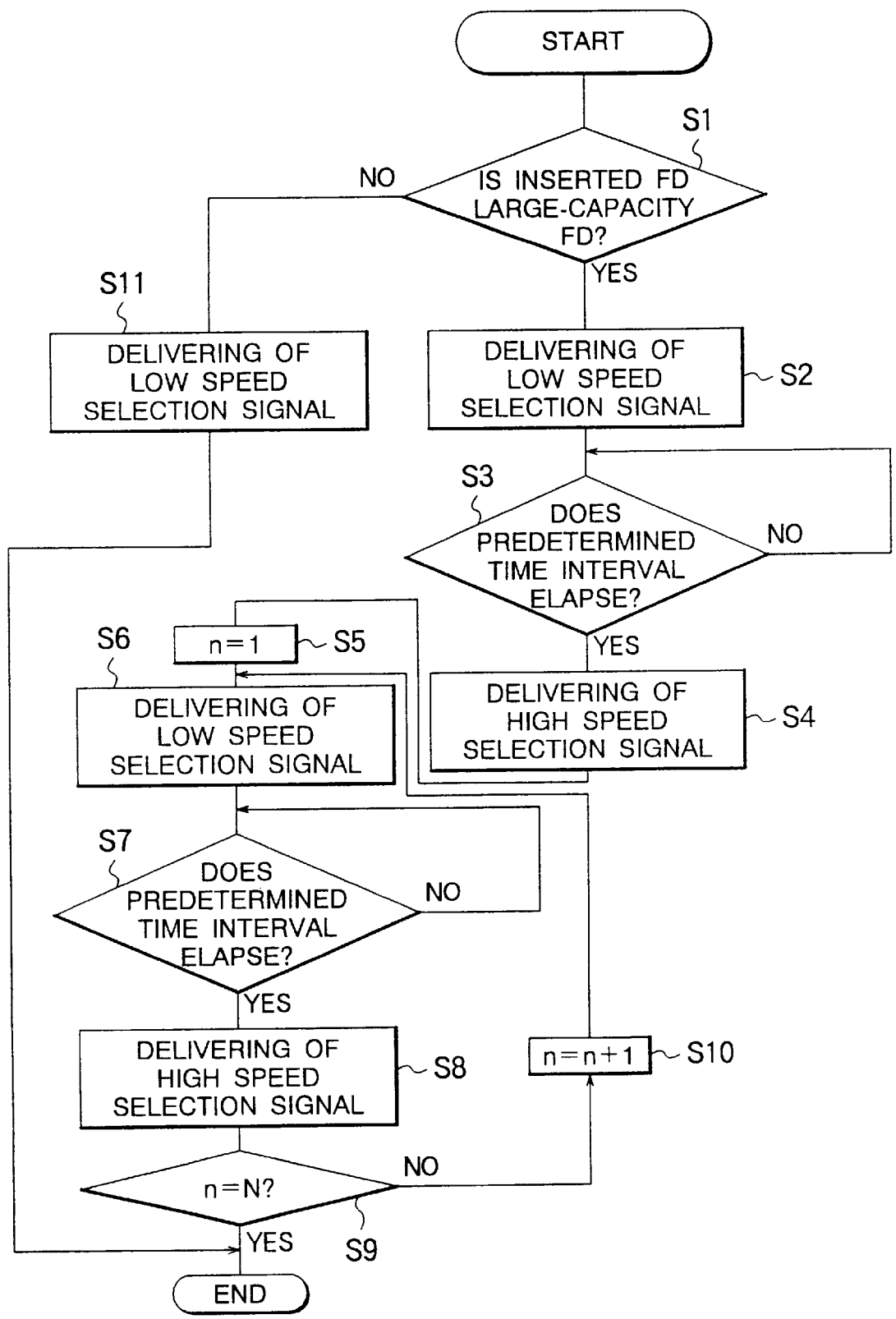
FIG. 5 is a flow chart for use in describing a starting method for the spindle motor and a disk chucking method for the high-density type flexible disk drive according to a first embodiment of this invention.

Referring to FIG. 5 in addition to FIGS. 1 through 4, description will proceed to a starting method of the spindle motor 100 and a disk chucking method for the high-density type FDD according to a first embodiment of this invention.

Description will at first proceed to operation in a case where the large-capacity FD 40 (FIG. 3) is inserted into the high-density type FDD illustrated in FIG. 1 and the large-capacity FD 40 is driven. When the large-capacity FD 40 is inserted into the high-density type FDD, a disk holder (not shown) holding the large-capacity FD 40 descends and then the large-capacity FD 40 is loaded with a load downwards. As a result, the disk hub 43 of the large-capacity FD 40 is mechanically in contact with the disk holder table 12 with the spindle shaft 104 of the spindle motor 100 freely received in the disk center hole 43a bored in the disk hub 43 of the large-capacity FD 40 and then the magnetic disk medium 41 of the large-capacity FD 40 is put between the pair of the magnetic heads. At the same time, the switch unit 50 detects that the inserted FD is the large-capacity FD 40 and then supplies the logic circuit 61 with the detected signal indicative of detection of the large-capacity FD 40.

Responsive to the detected signal, the logic circuit 61 determines that the inserted FD is the large-capacity FD 40 (YES in a first stage S1) and then delivers the low speed selection signal $S_L$ to the spindle motor driver 63 at a second stage S2. Responsive to the low speed selection signal $S_L$, the spindle motor driver 63 drives the spindle motor 100 so as to rotate at the low rotation speed of 300 rpm (or 360 rpm).

The second stage S2 is followed by a third stage S3 at which the logic circuit 61 determines whether or not a predetermined time interval (for example, 500 msec) elapses. Inasmuch as the disk holder table 12 rotates at the low rotation speed by the spindle motor 100 for the predetermined time interval, the chucking pin 108 of the spindle motor 100 may be freely received in the chucking hole 43b bored in the disk hub 43 of the large-capacity FD 40. It is noted that the chucking pin 108 is freely received in the chucking hole 43b alone and then chucking is not surely carried out between the disk hub 43 and the disk holder table 12 at this time instant. This is because the large-capacity FD 40 is different from the small-capacity FD and does not have an arrangement such as a lifter for applying any load to the magnetic disk medium 41 in the case 42 as described above.

After the predetermined time interval elapses (YES in the third stage S3), the logic circuit 61 delivers the high speed selection signal $S_H$ to the PLL circuit 631 of the spindle motor driver 63 at a fourth stage S4. Responsive to the high speed selection signal $S_H$, the spindle motor driver 63 drives the spindle motor 100 so as to rotate at the high rotation speed of 3600 rpm.

After the spindle motor 100 responds to the high speed selection signal $S_H$, the rotation speed of the spindle motor 100 changes from the low rotation speed of 300 rpm (or 360 rpm) up to the high rotation speed of 3600 rpm by a predetermined abrupt acceleration (which reaches the high rotation speed of 3600 rpm within, for example, three seconds). In the process of the above-mentioned changing of the rotation speed, the disk holder table 12 rotates in a clockwise direction indicated by at an arrow e in FIG. 2A. As a result, if the chucking pin 108 is freely received in the chucking hole 43b, the chucking pin 108 moves in the table driving oval hole 12a of the disk holder table 12 along the inclined portion 12a-1 thereof in the radial direction outwardly so as to make the chucking pin 108 emerge with the corner portion 43b-1 of the chucking hole 43b in the disk hub 43. Accordingly, the chucking may be surely carried out between the disk hub 43 and the disk holder table 12.

As described above, inasmuch as the spindle motor 100 rotates at the low rotation speed on rotation starting of the magnetic disk medium 41 of the large-capacity FD 40, the chucking is carried out during the low rotation speed. After the chucking is carried out, the spindle motor 100 rotates at the high rotation speed so as to rise up to the high rotation speed from the low rotation speed by the predetermined abrupt acceleration. Accordingly, it is possible to surely carry out the chucking on the rotation starting of the magnetic disk medium 41 of the large-capacity FD 40.

At a fifth stage S5 which succeeds the fourth stage S4, the logic logic circuit 61 sets a variable n in an initial value 1. At a sixth stage S6 which succeeds the fifth stage S5, the logic circuit 61 delivers the low speed selection signal $S_L$ to the spindle motor driver 63 like in the second stage S2. Responsive to the low speed selection signal $S_L$, the spindle motor driver 63 drives the spindle motor 100 so as to rotate at the low rotation speed of 300 rpm (or 360 rpm). The sixth stage S6 is followed by seventh and eighth stages S7 and S8 which are substantially equivalent to the third and the fourth stages S3 and S4, respectively. The sixth through the eighth stages S6 to S8 are carried out to ensure that the spindle motor 100 chucks the disk hub 43 of the large-capacity FD 40.

According to the embodiment of this invention, the sixth through the eighth stages S6 to S8 are repeated N (N is an integer equal to or greater than 2) times to highly ensure that the spindle motor 100 chucks the disk hub 43 of the large-capacity FD 40. That is, the logic circuit 61 judges whether or not the variable n is equal to N at a ninth stage S9. When the variable n is not equal to N, the logic circuit 61 increments the variable n by 1 at a tenth stage S10 and returns operation back to the sixth stage S6.

Although this embodiment is described in a case wherer N is an integer equal to or greater than 2, N may be equal to 1. In this case, a succession of the sixth through the eighth stages S6 to S8 is carried out only once to ensure that the spindle motor 100 chucks the disk hub 43 of the large-capacity FD 40.

In FIG. 5, each of the steps S3 and S7 judges whether or not the predetermined time interval elapses as described above. Alternatively, each of the steps S3 and S7 may judge whether or not the disk holder table 12 is rotated by one revolution.

Description will proceed to operation in a case where the small-capacity FD is inserted into the high-density type FDD illustrated in FIG. 1 and the small-capacity FD is driven. In this event, the switch unit 50 detects that the inserted FD is the small-capacity FD and then supplies the logic circuit 61 with the detected signal indicative of detection of the small-capacity FD. Responsive to the detected signal, the logic circuit 61 determines that the inserted FD is the small-capacity FD (NO in the first stage S1) and then delivers the low speed selection signal $S_L$ to the PLL circuit 631 of the spindle motor driver 63 at an eleventh stage S11. Responsive to the low speed selection signal $S_L$, the spindle motor driver 63 drives the spindle motor 100 so as to rotate at the low rotation speed of 300 rpm (or 360 rpm). It is noted that the small-capacity FD has the lifter for apply the load to the magnetic disk medium thereof in the case as described above. As a result, the chucking is surely carried out although the rotation speed of the magnetic disk medium in the small-capacity FD is the low rotation speed of 300 rpm (or 360 rpm).

Figure 6:
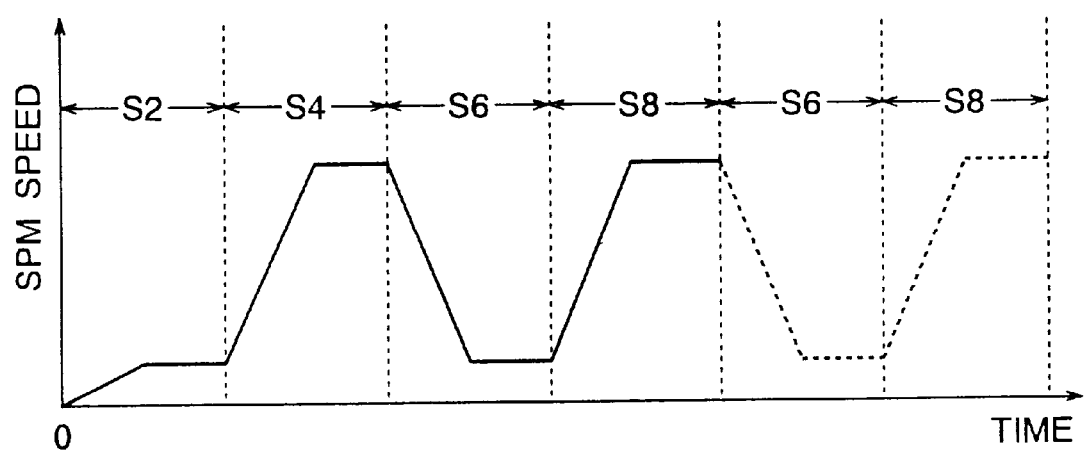
FIG. 6 is a time chart for use in describing the starting method and the disk chucking method of FIG. 5.

Turning to FIG. 6, change of the rotation speed of the spindle motor (SPM) 100 is illustrated in accordance with the starting method of the spindle motor (SPM) 100 and the disk chucking method of FIG. 5. FIG. 6 shows the rotation speed of the spindle motor (SPM) 100 at the second, the fourth, the sixth, and the eighth stages S2, S4, S6, and S8 of FIG. 5.

In FIG. 6, at the second stage S2, the rotation speed of the spindle motor (SPM) 100 is increased from zero up to a low rotation speed (300 rpm or 360 rpm) by a preselected acceleration on rotation starting of the magnetic disk medium 41. Subsequently, the rotation speed of the spindle motor (SPM) 100 is rotated at a constant speed equal to the low rotation speed (300 rpm or 360 rpm).

At the fourth stage S4, the rotation speed of the spindle motor (SPM) 100 is increased from the low rotation speed (300 rpm or 360 rpm) up to the high rotation speed (3600 rpm) by a predetermined abrupt acceleration. Subsequently, the rotation speed of the spindle motor (SPM) 100 is rotated at a constant speed equal to the high rotation speed (3600 rpm).

At the sixth stage S6, the rotation speed of the spindle motor (SPM) 100 is decreased from the high rotation speed (3600 rpm) down to the low rotation speed (300 rpm or 360 rpm) by a predetermined abrupt deceleration. Subsequently, the rotation speed of the spindle motor (SPM) 100 is rotated at the constant speed equal to the low rotation speed (300 rpm or 360 rpm).

At the eighth stage S8, the rotation speed of the spindle motor (SPM) 100 is increased from the low rotation speed (300 rpm or 360 rpm) up to the high rotation speed (3600 rpm) by the predetermined abrupt acceleration like in the fourth stage S4. Subsequently, the rotation speed of the spindle motor (SPM) 100 is rotated at the constant speed equal to the high rotation speed (3600 rpm).

A succession of the sixth and the eighth stages S6 and S8 is carried out at least once as mentioned above.

In the manner described above, each of the fourth and the eighth stages S4 and S8 comprises the step of increasing the rotation speed of the spindle motor (SPM) 100 from the low rotation speed (300 rpm or 360 rpm) up to the high rotation speed (3600 rpm) by the predetermined abrupt acceleration to make the chucking pin 108 by the predetermined abrupt acceleration move in the table driving oval hole 12a of the disk holder table 12 along the inclined portion 12a-1 thereof in the radial direction outwardly and to make the chucking pin 108 engage with the corner portion 43b-1 of the chucking hole 43b, whereby chucking is surely carried out between the disk holder table 12 and the disk hub 43.

Referring to FIGS. 7 through 10, description will proceed to a disk chucking confirming method and a spindle motor start controlling method according to a second embodiment of this invention.

It is described in conjunction with FIG. 1 that the rotor of the spindle motor 100 is provided with the motor index detection magnet 128 for generating a magnetic field as a motor index and that the high-density type flexible disk drive includes the magnetic sensor 129 for detecting the magnetic field as a motor index signal. The magnetic sensor 129 produces a detection pulse as the motor index signal whenever the rotor of the spindle motor is rotated by one revolution.

Figure 7:
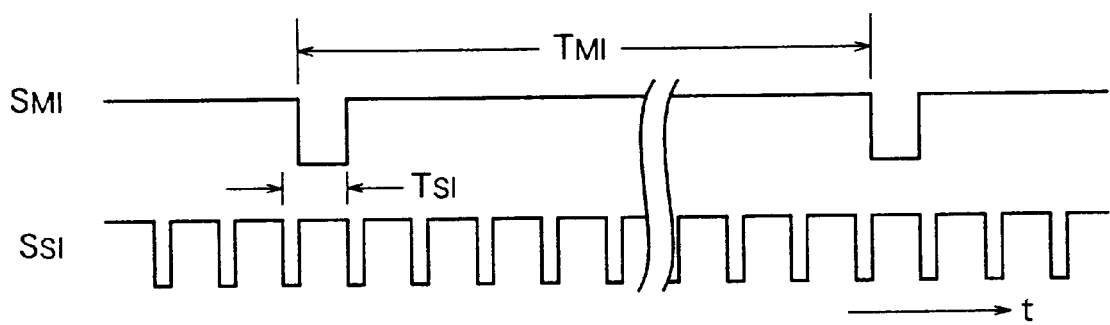
FIG. 7 is a time chart for use in describing operation of the high-density type flexible disk drive illustrated in FIG. 1.

In FIG. 7, the motor index signal is illustrated with the motor index signal labeled $S_{M1}$. Inasmuch as the rotor of the spindle motor 100 is rotated at the high rotation speed of 3600 rpm, a pulse period $T_{M1}$ of the motor index signal $S_{M1}$ is about 16.667 msec.

Figure 8:
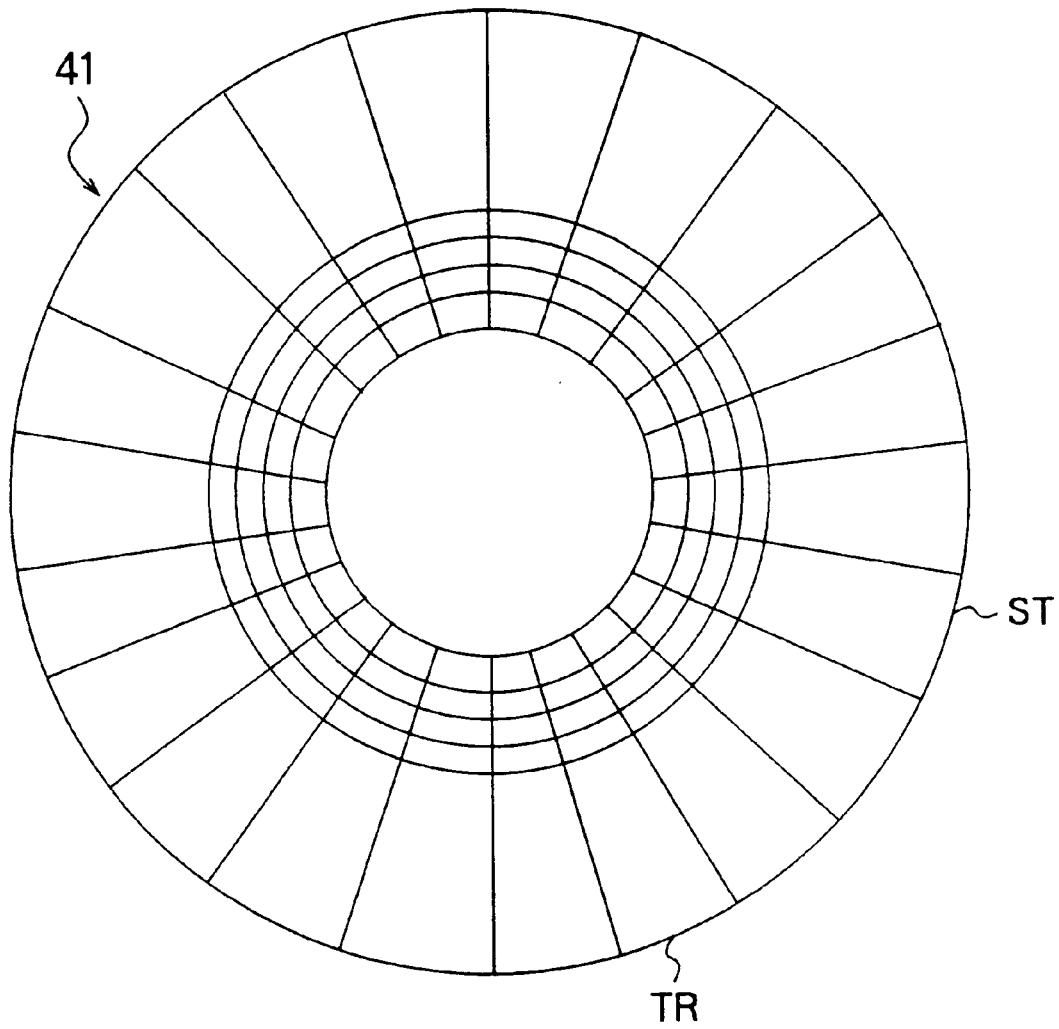
FIG. 8 is a plan view of a magnetic disk medium for use in the large capacity flexible disk illustrated in FIG. 3.

In FIG. 8, the large-capacity FD comprises a plurality of tracks TR arranged on the magnetic disk medium 41 with concentric circles. Each track TR is divided into a predetermined number of sectors ST having a length equal to one another. In the example being illustrated, the large-capacity FD comprises the tracks which are equal in total number and in available total number to 1866 and 1564 each side, respectively. Each track TR is divided into the sectors ST which are equal in number to 80. The large-capacity FD has a medium storage capacity of about 160 Mbytes and has a format storage capacity of about 128 Mbytes. That is, a physical format for the large-capacity FD having a storage capacity of 128 Mbytes arranges the tracks TR on the magnetic disk medium 41 of the large-capacity FD with concentric circles that are equal in number to 1564 on one side and divides each track TR into the sectors ST which are equal in number to 80.

Each sector ST consists of a servo area and a data area. A servo signal indicative of position of the sector ST is preliminarily written or memorized in the servo area of the sector ST. The servo signal comprises a number field indicative of the position of the sector and a sector timing mark (STM) field for notifying the number field. Inasmuch as the STM field has a specific pattern specific to the STM field, it is possible to know a starting position of the sector by reading the specific pattern from the STM field. Thus, the STM field serves as a sector index. Inasmuch as each track TR is divided into 80 sectors ST, it is possible to detector 80 sector indexes as a sector index signal while the magnetic disk medium 41 of the large-capacity FD is rotated by one revolution.

In FIG. 7, the sector index signal is illustrated with the sector index signal labeled $S_{S1}$. If the magnetic disk medium 41 is rotated at the high rotation speed of 3600 rpm, a pulse period $T_{S1}$ of the sector index signal $S_{S1}$ is about 0.20833 msec and is equal to 1/80 of the pulse period $T_{M1}$ of the motor index signal $S_{M1}$.

Figure 9:
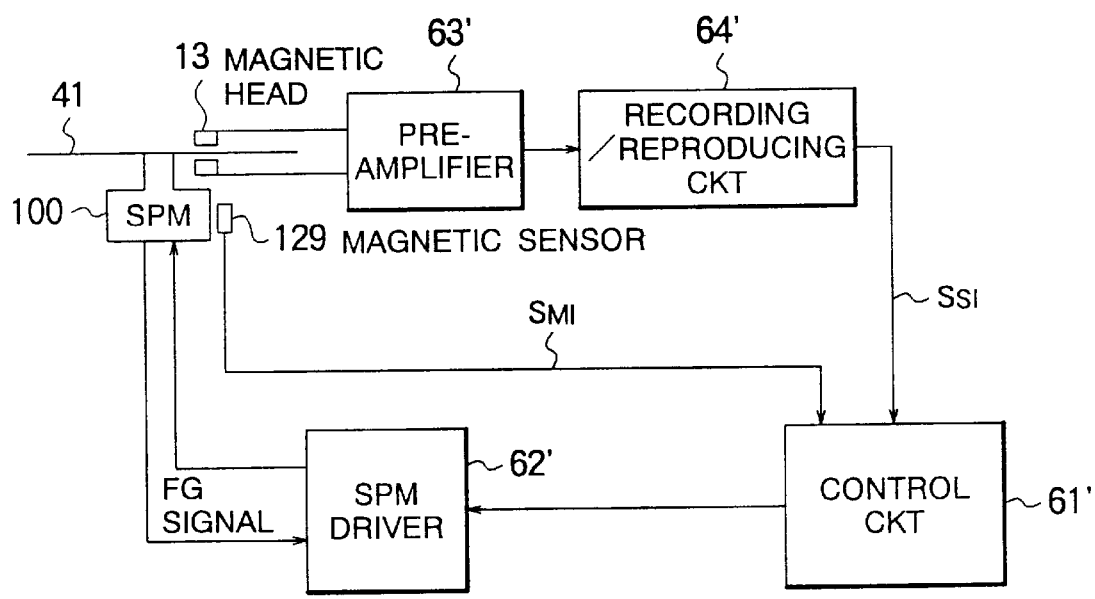
FIG. 9 is a block diagram of a control device which carries out a disk chucking confirming method and a spindle motor start controlling method according to this invention.

In FIG. 9, a control device is illustrated which controls driving of the spindle motor 100. The control device comprises a control circuit 61' for producing a driving control signal in response to the motor index signal $S_{M1}$ and to the sector index signal $S_{S1}$ and an SPM (spindle motor) driver 62' for driving the spindle motor 100 in response to the driving control signal and to the FG (frequency generation) signal which is described above. The control circuit 61' is constituted by, for example, a microcomputer.

The servo signal memorized in the magnetic disk medium 41 of the large-capacity FD is read from the magnetic disk medium 41 by a magnetic head 13, amplified by a preamplifier 63', and reproduced by a recording/reproducing circuit 64'. In this event, the recording/reproducing circuit 64' produces the sector index signal $S_{S1}$ by extracting sector indexes from the servo signal.

Figure 10:
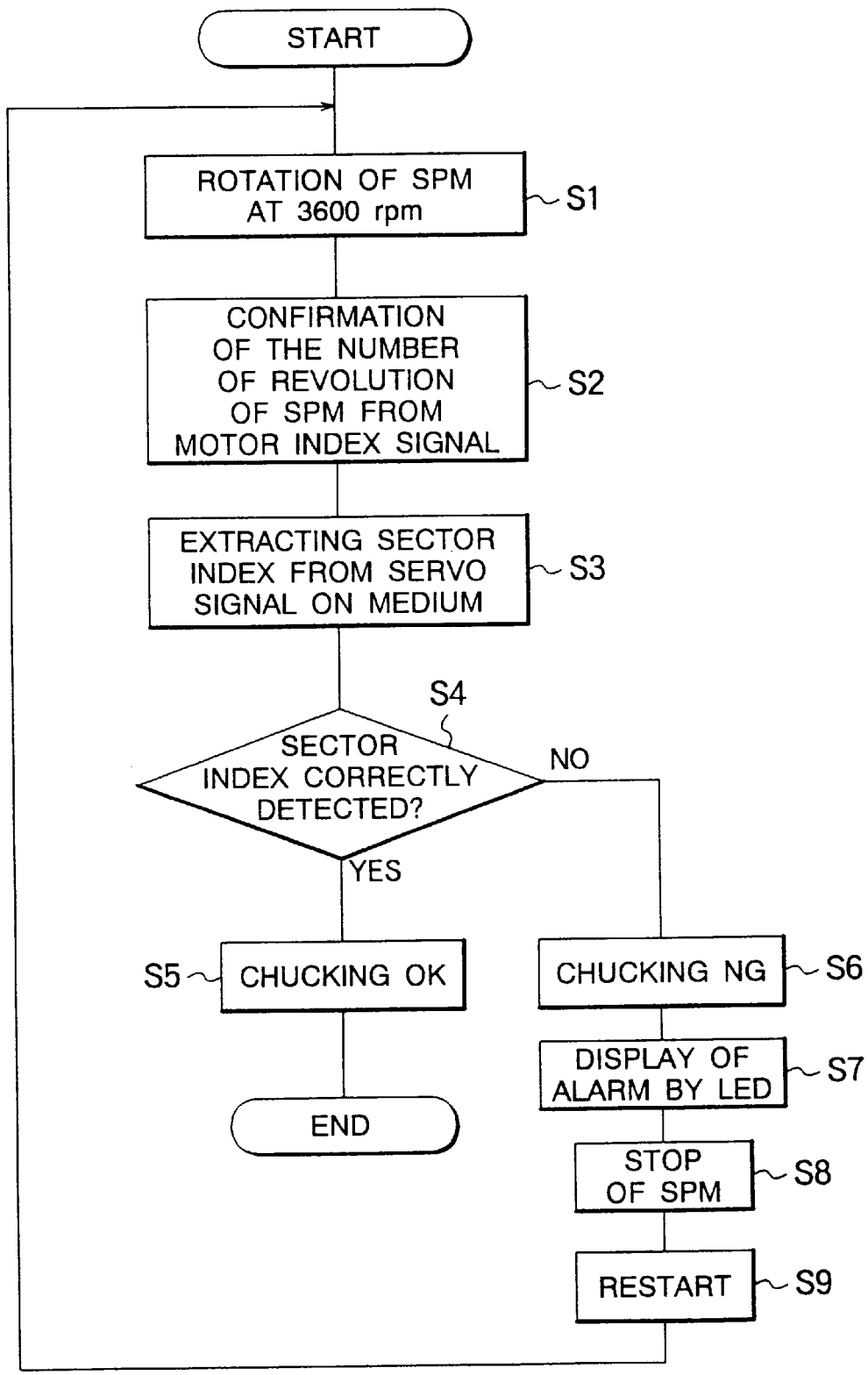
FIG. 10 is a flow chart for use in describing a disk chucking confirming method and a spindle motor start controlling method according to a second embodiment of this invention.

Referring to FIG. 10 in addition to FIG. 9, description will proceed to the disk chucking confirming method and the spindle motor start controlling method according to the second embodiment of this invention.

When the large-capacity FD 40 (FIG. 3) is inserted into the high-density type FDD illustrated in FIG. 1, the disk holder (not shown) holding the large-capacity FD 40 descends and then the large-capacity FD 40 is loaded with a load downwards. As a result, the disk hub 43 of the large-capacity FD 40 is mechanically in contact with the disk holder table 12 with the spindle shaft 104 of the spindle motor 100 freely received in the disk center hole 43a bored in the disk hub 43 of the large-capacity FD 40 and then the magnetic disk medium 41 of the large-capacity FD 40 is put between the pair of the magnetic heads 13. At the same time, the switch unit 50 detects that the inserted FD is the large-capacity FD 40 and then supplies the control circuit 61' with the detected signal indicative of detection of the large-capacity FD 40.

Responsive to the detected signal, the control circuit 61' delivers to the SPM driver 62' the driving control signal which instructs to make the spindle motor (SPM) 100 be rotated at the high rotation speed of 3600 rpm (a first stage S1). In response to the driving control signal, the SPM driver 62' rotates the rotor of the spindle motor (SPM) 100 at the high rotation speed of 3600 rpm on the basis of the FG signal. The motor index signal $S_{M1}$ is delivered to the control circuit 61' from the magnetic sensor 129. From the motor index signal $S_{M1}$, the control circuit 61' confirms that the rotor of the spindle motor (SPM) 100 is rotated at the high rotation speed of 3600 rpm (a second stage S2). On the other hand, the servo signal memorized in the magnetic disk medium 41 of the large-capacity FD 40 is read from the magnetic disk medium 41 by the magnetic head 13, amplified by the preamplifier 63', and reproduced by the recording/reproducing circuit 64'. The recording/reproducing circuit 64' extracts the sector indexes from the servo signal (a third stage S3) and produces the sector index signal $S_{S1}$. The control circuit 61' judges whether or not the sector index signal $S_{S1}$ is detected correctly (or in a prescribed manner) (a fourth stage S4). If the spindle motor (SPM) 100 surely chucks the disk hub 43 of the large-capacity FD 40, the magnetic disk medium 41 of the large-capacity FD 40 is rotated at 3600 rpm. In this event, 80 sector indexes are detected as the sector index signal $S_{S1}$ during the pulse period $T_{M1}$ of the motor index signal $S_{M1}$.

If the sector index signal $S_{S1}$ is detected in the prescribed manner (YES of the fourth stage S4), the control circuit 61' judges that the chucking is successful (OK) (a fifth stage S5) and makes operation come to an end. If the sector index signal $S_{S1}$ is not detected in the prescribed manner (NO of the fourth stage S4), the control circuit 61' judges that the chucking is unsuccessful (NG) (a sixth stage S6) and announces (displays) an alarm by, for example, an LED (Light Emitting Diode) (a seventh stage S7). Subsequently, the control circuit 61' delivers to the SPM driver 62' the driving control signal which instructs to make driving of the spindle motor (SPM) 100 stop (an eighth stage S8). In response to the driving control signal, the SPM driver 62' stops the driving of the spindle motor (SPM) 100. After a preselected time interval elapses, in order to restart the spindle motor (SPM) 100 (a ninth stage S9), the control circuit 61' delivers to the SPM driver 62' the driving control signal which instructs to make the spindle motor (SPM) 100 be rotated at the high rotation speed of 3600 rpm (the first stage S1).

Alternatively, the control circuit 61' makes operation come to an end after stopping of the driving of the spindle motor (SPM) 100 at the eighth stage S8 without carrying out restarting of the spindle motor (SPM) 100 at the ninth stage S9.

While this invention has thus far been described in conjunction with a few preferred embodiments thereof, it will now be readily possible for those skilled in the art to put this invention into various other manners. For example, switching of the rotation speed in the spindle motor 100 may be carried out by switching of clock frequencies of the clock oscillator 62 although the switching of the rotation speed in the spindle motor is carried out by switching of a dividing number in the PLL circuit 631 in the above-mentioned embodiments. In addition, the spindle motor driver 63 may comprise two PLL circuits, namely, a first PLL circuit for the low rotation speed and a second PLL circuit for the high rotation speed and may select one of the two PLL circuits by switching from one to another.

What is claimed is:

1. A method of starting rotation of a magnetic disk medium of a large-capacity flexible disk by a spindle motor for use in a high-density type flexible disk drive for carrying out data recording and reproducing operation to and from the magnetic disk medium of said large-capacity flexible disk which requires to rotate at a high rotation speed on recording and reproducing, said large-capacity flexible disk having a disk hub for holding said magnetic disk medium, said method comprising:

a first step of rotating said spindle motor at a low rotation speed lower than said high rotation speed on rotation starting of said magnetic disk medium;

a second step of rotating said spindle motor at said high rotation speed subsequently to rotating of said spindle motor at said low rotation speed;

a third step of rotating said spindle motor at said low rotation speed subsequently to rotating of said spindle motor at said high rotation speed; and a fourth step of rotating said spindle motor at said high rotation speed subsequently to rotating of said spindle motor at said low rotation speed at said third step;

said second and said fourth steps being carried out to ensure that said spindle motor chucks the disk hub of said large-capacity flexible disk.

2. A method as claimed in claim 1, wherein said high rotation speed is a rotation speed ten times or more as large as said low rotation speed.

3. A method as claimed in claim 2, wherein said high rotation speed has the number of revolution of 3600 rpm, said low rotation speed having the number of revolution of 300 rpm.

4. A method as claimed in claim 1, wherein each of said second and said fourth steps comprises the steps of:

increasing the rotation speed of said spindle motor from said low rotation speed up to said high rotation speed by a predetermined abrupt acceleration; and rotating said spindle motor at a constant speed equal to said high rotation speed.

5. A method as claimed in claim 1, further comprising:

a fifth step of repeating said third and said fourth steps at least once again to highly ensure that said spindle motor chucks the disk hub of said large-capacity flexible disk.

6. A disk chucking method for use in a high-density type flexible disk drive for carrying out data recording and reproducing operation to and from a magnetic disk medium of a large-capacity flexible disk which requires to rotate at a high rotation speed on recording and reproducing, said large-capacity flexible disk having a structure so as to reduce a load with respect to said magnetic disk medium on rotating thereof, said large-capacity flexible disk comprising a disk hub for holding said magnetic disk medium, said disk hub having a chucking hole with a corner portion in said disk hub in a radial direction outwardly, said high-density type flexible disk drive including a spindle motor for rotating said disk hub, said spindle motor comprising a disk holder table for holding said disk hub and a chucking pin which should be freely received in said chucking hole, said disk holder table having a table driving oval hole with an inclined portion, said method comprising:

a first step of rotating said spindle motor at a low rotation speed lower than said high rotation speed on rotation starting of said magnetic disk medium;

a second step of rotating said spindle motor at said high rotation speed subsequently to rotating of said spindle motor at said low rotation speed;

a third step of rotating said spindle motor at said low rotation speed subsequently to rotating of said spindle motor at said high rotation speed; and a fourth step of rotating said spindle motor at said high rotation speed subsequently to rotating of said spindle motor at said low rotation speed at said third step;

each of said second and said fourth steps comprising the step of increasing the rotation speed of said spindle motor from said low rotation speed up to said high rotation speed by a predetermined abrupt acceleration to make said chucking pin by said predetermined abrupt acceleration move in the table driving oval hole of said disk holder table along said inclined portion thereof in said radial direction outwardly and to make said chucking pin engage with the corner portion of said chucking hole, whereby chucking is surely carried out between said disk holder table and said disk hub.

7. A method as claimed in claim 6, wherein said high rotation speed is a rotation speed ten times or more as large as said low rotation speed.

8. A method as claimed in claim 7, wherein said high rotation speed has the number of revolution of 3600 rpm, said low rotation speed having the number of revolution of 300 rpm.

9. A method as claimed in claim 6, further comprising:

a fifth step of repeating said third and said fourth steps at least once again, whereby chucking is more surely carried out between said disk holder table and said disk hub.

10. A disk chucking confirming method for use in a high-density type flexible disk drive for carrying out data recording and reproducing operation to and from a magnetic disk medium of a large-capacity flexible disk which requires to rotate at a high rotation speed by a spindle motor of said high-density type flexible disk drive on recording and reproducing, said spindle motor including a motor index detection magnet fixed thereto for generating a magnetic field as a motor index, said high-density type flexible disk drive including a magnetic sensor for detecting said magnetic field as a motor index signal, said large-capacity flexible disk comprising a plurality of tracks arranged on said magnetic disk medium with concentric circles, each track being divided into a predetermined number of sectors having a length equal to one another, each sector preliminarily memorizing a servo singal having a sector index, said method being for confirming whether or not said spindle motor surely chucks said magnetic disk medium of the large-capacity flexible disk, said method comprising:

a first step of rotating said spindle motor at said high rotation speed;

a second step of confirming that said spindle motor is rotated at said high rotation speed on the basis of said motor index signal;

a third step of reading, as a sector index signal, the sector indexes of said servo signals from said sectors on said magnetic disk medium; and a fourth step of judging whether or not said sector index signal is correctly detected so as to confirm whether or not said spindle motor surely chucks said magnetic disk medium of the large-capacity flexible disk.

11. A spindle motor start controlling method for use in a high-density type flexible disk drive for carrying out data recording and reproducing operation to and from a magnetic disk medium of a large-capacity flexible disk which requires to rotate at a high rotation speed by a spindle motor of said high-density type flexible disk drive on recording and reproducing, said spindle motor including a motor index detection magnet fixed thereto for generating a magnetic field as a motor index, said high-density type flexible disk drive including a magnetic sensor for detecting said magnetic field as a motor index signal, said large-capacity flexible disk comprising a plurality of tracks arranged on said magnetic disk medium with concentric circles, each track being divided into a predetermined number of sectors having a length equal to one another, each sector preliminarily memorizing a servo signal having a sector index, said method being for controlling a start of rotation of said magnetic disk medium due to said spindle motor, said method comprising:

a first step of rotating said spindle motor at said high rotation speed;

a second step of confirming that said spindle motor is rotated at said high rotation speed on the basis of said motor index signal;

a third step of reading, as a sector index signal, the sector indexes of said servo signals from said sectors on said magnetic disk medium;

a fourth step of judging whether or not said sector index signal is correctly detected so as to confirm whether or not said spindle motor surely chucks said magnetic disk medium of the large-capacity flexible disk; and a fifth step of announcing an alarm and of stopping said spindle motor when said fourth step confirms that said spindle motor does not surely chuck said magnetic disk medium of the large-capacity flexible disk by judging that said sector index signal is not correctly detected.

12. A spindle motor start controlling method as claimed in claim 11, further comprising:

a sixth step of restarting said spindle motor subsequently to said fifth step to return operation back to said first step.

* * * * *